(12) United States Patent
Shmunis et al.

(10) Patent No.: US 8,831,597 B1
(45) Date of Patent: Sep. 9, 2014

(54) UNIFIED CALLER IDENTIFICATION ACROSS MULTIPLE COMMUNICATION MODES

(75) Inventors: Vladimir Shmunis, South Lake Tahoe, CA (US); Vlad Vendrow, Redwood Shores, CA (US)

(73) Assignee: RingCentral, Inc., San Mateo, CA (US)

( * ) Notice: Subject to any disclaimer, the term of this patent is extended or adjusted under 35 U.S.C. 154(b) by 0 days.

(21) Appl. No.: 13/454,879

(22) Filed: Apr. 24, 2012

Related U.S. Application Data

(63) Continuation of application No. 13/224,741, filed on Sep. 2, 2011.

(60) Provisional application No. 61/379,722, filed on Sep. 2, 2010.

(51) Int. Cl.
*H04W 24/00* (2009.01)

(52) U.S. Cl.
USPC ........................................ 455/426.1; 370/338

(58) Field of Classification Search
USPC ........................................ 455/426.1; 370/338
See application file for complete search history.

(56) References Cited

U.S. PATENT DOCUMENTS

| | | | |
|---|---|---|---|
| 4,734,928 A | 3/1988 | Weiner et al. | |
| 6,442,404 B1 | 8/2002 | Sakajiri | |
| 6,545,697 B1 | 4/2003 | Parket et al. | |
| 6,647,107 B1 | 11/2003 | Horrer | |
| 6,671,366 B1 | 12/2003 | Isotalo | |
| 6,889,045 B2 | 5/2005 | Pan et al. | |
| 6,967,947 B1 | 11/2005 | Chen et al. | |
| 7,139,797 B1 | 11/2006 | Yoakum et al. | |
| 7,167,710 B2 | 1/2007 | Thakkar et al. | |
| 7,245,913 B1 | 7/2007 | Nguyen et al. | |
| 7,308,255 B2 | 12/2007 | Loveland | |
| 7,822,186 B1 | 10/2010 | Boni | |
| 8,098,810 B2 | 1/2012 | Lyman | |

(Continued)

FOREIGN PATENT DOCUMENTS

| | | |
|---|---|---|
| EP | 1 453 283 A1 | 9/2004 |
| EP | 2 166 733 A1 | 3/2010 |
| KR | 10-2005-0014088 | 2/2005 |
| KR | 10-2008-0029682 | 4/2008 |

OTHER PUBLICATIONS

International Preliminary Report on Patentability from International Application No. PCT/US2009/051598, dated Feb. 17, 2011, 8 pages.

(Continued)

*Primary Examiner* — Marcos Batista
(74) *Attorney, Agent, or Firm* — Fish & Richardson P.C.

(57) ABSTRACT

A mobile device is adapted to operate in a first communication mode and a second communication mode. An identifier is acquired for a mobile device, wherein the identifier is sent to identify the mobile device when the mobile device places a call in the first communication mode. A call is placed to a destination device while the mobile device operates in the second communication mode. The same identifier is sent to the destination device while the mobile device operates in the second communication mode. The mobile device is served by a first service provider while it operates in the first communication mode. The mobile device is served by a second service provider while it operates in the second communication mode, the second service provider being different from the first service provider.

23 Claims, 3 Drawing Sheets

(56) References Cited

U.S. PATENT DOCUMENTS

| | | | |
|---|---|---|---|
| 8,121,592 B2 | 2/2012 | Hayakawa | |
| 8,125,931 B2 | 2/2012 | Faber et al. | |
| 2002/0042812 A1* | 4/2002 | Spencer | 709/203 |
| 2002/0067714 A1 | 6/2002 | Crain et al. | |
| 2003/0186686 A1 | 10/2003 | Yang et al. | |
| 2004/0062383 A1 | 4/2004 | Sylvain | |
| 2004/0122901 A1 | 6/2004 | Sylvain | |
| 2004/0204038 A1 | 10/2004 | Suzuki et al. | |
| 2005/0047373 A1 | 3/2005 | Kojima | |
| 2005/0190747 A1 | 9/2005 | Sindhwani et al. | |
| 2006/0045056 A1* | 3/2006 | O'Hara, Jr. | 370/338 |
| 2006/0126806 A1 | 6/2006 | Trandal et al. | |
| 2006/0140200 A1 | 6/2006 | Black et al. | |
| 2007/0047519 A1* | 3/2007 | Bangor et al. | 370/352 |
| 2007/0058637 A1 | 3/2007 | Lo | |
| 2007/0070976 A1 | 3/2007 | Mussman et al. | |
| 2007/0105531 A1 | 5/2007 | Schroeder | |
| 2007/0149182 A1 | 6/2007 | Muratore et al. | |
| 2007/0153771 A1* | 7/2007 | Doradla et al. | 370/352 |
| 2007/0153986 A1 | 7/2007 | Bloebaum | |
| 2007/0217591 A1 | 9/2007 | Yasuma | |
| 2007/0233875 A1 | 10/2007 | Raghav et al. | |
| 2007/0253545 A1 | 11/2007 | Chatterjee et al. | |
| 2008/0046580 A1* | 2/2008 | Lafuente et al. | 709/229 |
| 2008/0126145 A1 | 5/2008 | Rackley, III et al. | |
| 2008/0153554 A1 | 6/2008 | Yoon et al. | |
| 2008/0181211 A1* | 7/2008 | Parolkar et al. | 370/389 |
| 2008/0247530 A1 | 10/2008 | Barton et al. | |
| 2008/0267371 A1 | 10/2008 | Shibata | |
| 2009/0022103 A1 | 1/2009 | Shatsky | |
| 2009/0112996 A1 | 4/2009 | Baker, III et al. | |
| 2009/0116466 A1 | 5/2009 | Lee et al. | |
| 2009/0178005 A1* | 7/2009 | Jheng | 715/825 |
| 2009/0310598 A1 | 12/2009 | Winbladh | |
| 2010/0035594 A1 | 2/2010 | Vendrow et al. | |
| 2010/0046731 A1 | 2/2010 | Gisby et al. | |
| 2010/0166170 A1* | 7/2010 | East et al. | 379/221.01 |
| 2010/0297986 A1 | 11/2010 | Cermak et al. | |
| 2011/0244878 A1 | 10/2011 | Kochetkov et al. | |
| 2011/0281549 A1 | 11/2011 | Bajpai et al. | |
| 2013/0072153 A1 | 3/2013 | Lawson et al. | |
| 2013/0343530 A1 | 12/2013 | Makhmudov et al. | |

OTHER PUBLICATIONS

International Search Report and Written Opinion in Application No. PCT/US2009/051598, dated Mar. 9, 2010.

RingCentral® User Guide, RingCentral Online, http://www.ringcentral.com, San Mateo, CA, Jan. 7, 2007, 32 pp.

EPO Communication from EP Application No. 09805350.7 dated Jan. 23, 2013, 6 pages.

International Search Report and Written Opinion from International Application No. PCT/US2012/032781, mailed Jan. 3, 2013, 13 pages.

Sparks, R., "Simple Presence Document Usage Examples; draft-sparks-simple-pdoc-usage-oo.txt", dynamicsoft, Oct. 17, 2003, 27 pages.

Vasala, K., "Enabling Network Based Presence Aggregation using IMS", IP Multimedia Subsystem Architecture and Applications, 2007 International Conference on, IEEE, Piscataway, New Jersey, USA, Dec. 6, 2007, pp. 1-5.

EPO Search Report from EP Application No. 09805350.7 dated Jan. 10, 2013, 4 pages.

"3rd Generation Partnership Project; Technical Specification Group Core Network and Terminals; Combining CS calls and IMS sessions; Stage 3 (Release 7)", 3GPP Standard; 3GPP TR 24.879, 3rd Generation Partnership Project (3GPP), Mobile Competence Centre; 650, Route des Lucioles; F-06291, No. V7.0.0.0, Mar. 1, 2006, pp. 1-73.

* cited by examiner

UNIFIED CALLER IDENTIFICATION ACROSS MULTIPLE COMMUNICATION MODES

CROSS-REFERENCE TO RELATED APPLICATIONS

This application is a continuation of pending U.S. patent application Ser. No. 13/224,741, filed on Sep. 2, 2011, entitled "Unified Caller Identification Across Multiple Communication Modes", which claims the benefit of priority under 35 U.S.C. §119(e) of U.S. Provisional Application Ser. No. 61/379,722, filed on Sep. 2, 2010. The disclosures of the foregoing applications are incorporated herein by reference in their entirety.

BACKGROUND

Each mobile telephone ("mobile phone") is associated with a unique phone number. When a caller places a call from a mobile phone to a destination device, the unique phone number of the mobile phone can be transmitted to the destination device as an identifier. This feature is typically referred to as caller identification, or "Caller ID".

A mobile phone is generally associated with a first service provider that sends and receives calls to and from the phone, and provides other messaging services to the mobile phone. The first service provider can also provide the mobile phone with access to a network of cellular base stations for sending and receiving calls. Many mobile phones can also be installed with software applications that extend the capabilities of the mobile phone. Some of these software applications offer telecommunication services (e.g. voice over internet protocol, text messaging) provided by a different service provider than the first service provider.

SUMMARY

A mobile device can be adapted to operate in a first communication mode and a second communication mode. An identifier can be acquired for a mobile device, wherein the identifier can be sent to identify the mobile device when the mobile device places a call in the first communication mode. A call can be placed to a destination device while the mobile device operates in the second communication mode. The same identifier can be sent to the destination device while the mobile device operates in the second communication mode. The mobile device can be served by a first service provider while it operates in the first communication mode, and by a second service provider while it operates in the second communication mode, the second service provider being different from the first service provider.

DETAILED DESCRIPTION

Many mobile phones can be installed with software applications that extend the capabilities of the mobile phone. Some of these software applications can include additional communication services offered by a service provider ("second service provider") that is different from the first service provider associated with the mobile phone. For example, some second service providers may sell or offer Voice-Over-Internet-Protocol (VOIP) applications for installation on a mobile phone. These VOIP applications allow a user of the mobile phone to make calls using VoIP services offered through the second service provider, instead of making the call through the first service provider. Advantages of going through a second service provider may include, for example, lower calling costs, greater flexibility in handling calls, and greater variety of services available to the user.

Each mobile phone is typically associated with a phone number that is used by default ("default phone number"). Typically, each installed VOIP application also can be associated with a phone number ("application phone number") that identifies the mobile phone when a user makes calls using the VOIP application. In some implementations, the application phone number and the default phone number of the mobile phone can be different. In implementations where both numbers are different, having two different phone numbers for the same mobile phone may lead to unneeded complexity and confusion for the user, as the user must now manage at least two different phone numbers for the same mobile phone. The user's contacts must also deal with additional complexity and confusion, as the user may be calling from two different phone numbers depending on which service provider is used. This is especially undesirable for small-business owners who want to avoid confusing prospective and existing customers of the origin of their business calls.

Exemplary System

Figure 1:
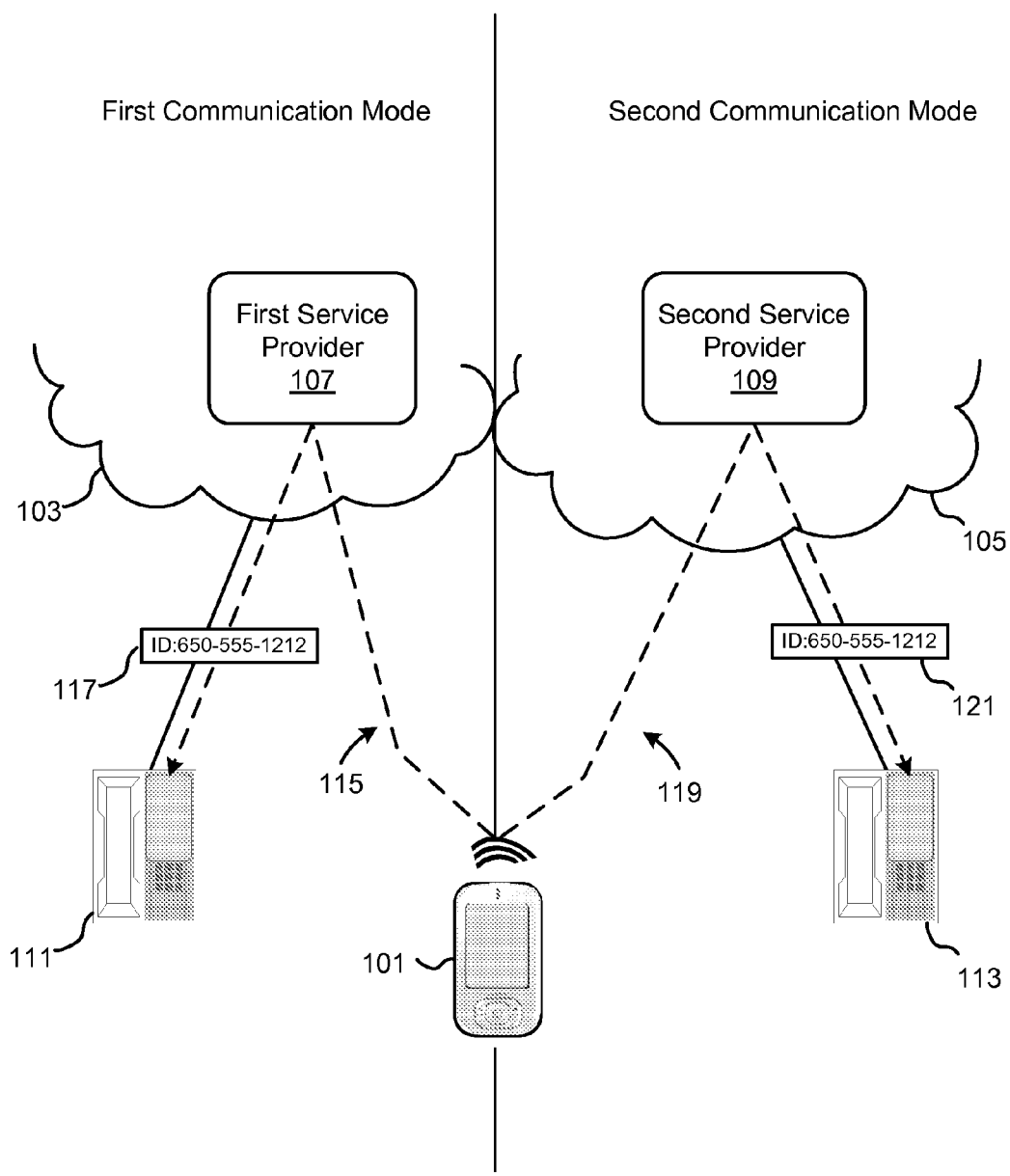
FIG. 1 is a block diagram showing an exemplary system for unified caller identification across multiple communication modes.

FIG. 1 is a block diagram showing an exemplary system for unified caller identification across multiple communication modes. The system can include a mobile device 101, a network 103, a network 105, a first service provider 107, a second service provider 109, and destination devices 111 and 113. Although the destination devices 111 and 113 are each illustrated as a desktop landline phone, one skilled in the art would readily recognize that destination devices 111 and 113 are not limited to a desktop landline phone, and can be any device for receiving a phone call, such as, without limitation, a mobile phone, a fax machine, a videophone, and the like.

In some implementations, the mobile device 101 can operate in a first communication mode when the mobile device 101 communicates through the first service provider 107 to call the destination device 111. In some implementations, the mobile device 101 also can operate in a second communication mode when the mobile device 101 communicates through the second service provider 109 to call the destination device 113, as will be discussed in greater detail below.

The mobile device 101 can be in wireless communication with networks 103 and 105. The mobile device 101 can be a mobile cellular phone such as, for example, a smartphone, or can be any other mobile device having call functions. The first service provider 107 can be in communication with the network 103. The network 103 can include various signal channels and networks that a call can pass through in order to reach a caller receiving the call using the destination device 111. The network 103 can include, without limitation, cellular networks, public switched telephone networks (PSTN), packet-switched networks such as the Internet, wireless networks such as wireless local area networks (WLAN) or WiFi networks, and the like, and the various gateways interconnecting the different types of networks. The destination device 111 also can be in communication with the network 103. As shown, a call placed from the mobile device 101 to the destination device 111 via the first service provider 107 can be represented by a dashed line 115.

The second service provider 109 can be in communication with the network 105. Similar to the network 103, the network 105 can include various signal channels and networks that a call may pass through in order to reach a caller at the destination device 113. The network 105 can include, without limitation, cellular networks, public switched telephone networks (PSTN), packet-switched networks such as the Internet, wireless networks such as wireless local area networks (WLAN) or WiFi networks, and the like, and the various gateways interconnecting the different types of networks. In some implementations, the network 105 can overlap with the network 103. In other implementations, both networks 103/105 can be separate and distinct with no overlapping coverage. As shown, a call placed from the mobile device 101 to the destination device 113 via the second service provider 109 can be represented by a dashed line 119.

When operating in a first communication mode, the mobile device 101 can place an outgoing call 115 to the destination device 111 via a first service provider 107. The call 115 can be routed by the first service provider 107 through the network 103 to the destination device 111. The outgoing call 115 can include an identifier 117 that identifies the mobile phone 101 to the destination device 111. In some implementations, the identifier 117 can be a unique phone number (e.g. "650-555-1212") associated with the mobile phone 101, or other identifying information unique to the mobile device 101. In some implementations, in the first communication mode, the mobile device 101 can place the outgoing call 115 using a cellular network offered by the first service provider 107.

When operating in the second communication mode, the mobile device 101 can place an outgoing call 119 to the destination device 113 via a second service provider 109. In some implementations, the second communication mode can be enabled by installing a telephony application from the second service provider 109 onto the mobile device 101. The mobile device 101 can enable or switch to the second communication mode when a user places the outgoing call 119 using the installed telephony application. Such telephony applications and other applications are readily available for download and installation onto mobile devices from online stores such as, for example, the Apple iTunes™ App Store, the Android Market, and others.

In some implementations, the second communication mode can be enabled by use of a device driver installed onto the mobile device 101 rather than a software application. In some implementations, the second communication mode can be enabled through software, device drivers, or other functionalities that are built-in to or pre-installed on the mobile device 101. One skilled in the art would recognize that the second communication mode as illustrated also can be enabled by other mechanisms, and is not limited to those discussed above.

The outgoing call 119 can be routed by the second service provider 109 through the network 105 to the destination device 113. The call 119 can include an identifier 121 that identifies the mobile device 101 to the destination device 113. In some implementations, the identifier 121 used in the second communication mode can be the same as the identifier 117 used in the first communication mode. In these implementations, a user calling from the mobile device 101 in both the first communication mode and the second communication mode can be identified with the same identifier to the destination device 113.

In some implementations, the mobile device 101 can operate in the second communication mode using VOIP telephony. For example, the second service provider 109 can provide VoIP services that can be accessible to a user who installs a VOIP application from the second service provider 109 onto the mobile device 101. It should be noted that although the term "VOIP" includes the word "voice", VOIP services are not limited to voice communications, as VOIP services can include various forms of telecommunications transmitted over IP, such as, without limitation, facsimile communications, video communications, text communications, and data communications.

In some implementations, the network accessibility of the mobile device 101 can be limited while operating in the second communication mode. For example, the mobile device 101 can only send signals via a wireless local area network (WLAN) while operating in the second communication mode. All calls placed from the mobile device 101 can be transmitted over the WLAN and routed to the second service provider 109. The WLAN (also referred to sometimes as "WiFi network") is typically designed according to a standard within the Institute of Electrical and Electronics Engineers (IEEE) 802.11 family of standards.

In some implementations, making calls over the WLAN while operating in the second communication mode can be advantageous for the mobile device 101, in comparison to using cellular transmissions in the first communication mode. Exemplary advantages can include, without limitations, better signal strength due to closer proximity to a WiFi access point, higher bandwidth, and lower calling costs since WiFi access may be less expensive than paying for a subscription to the first service provider 107. WiFi access is even available in some areas for free to users and callers.

In some implementations, the mobile device 101 can be restricted from making calls in a first communication mode. This may be the case when the mobile device 101 is not a phone by default. For example, certain mobile devices (such as the Apple® iPod Touch®, the Apple® iPad®, the Kindle®, etc.) are capable of communicating with a wireless network such as a WLAN. These devices are computing devices, but are not mobile phones by default. However, software applications from second service providers 109 can still be installed onto such devices to enable users from making calls over the wireless network through the second service providers 109.

In some implementations, the second communication mode need not always be available to a user. For example, the mobile device 101 may be required to be in close proximity to a WLAN in order to place a call or send the identifier to the receiving device in the second communication mode. Where no WLAN is nearby, the mobile device 101 can switch back to the first communication mode so that an outgoing call can be placed and the identifier sent.

In some implementations, the choice of using the first communication mode or the second communication mode is left to the user. The user can decide in which mode to operate the mobile device 101 when a call is placed. In some implementations, the choice of using the first or second communication mode is not left to the user but is based on certain call properties that are examined automatically. For example, the telephony application 215 may analyze the available communication modes to automatically determine the preferred mode to use to place a call. One property that can be considered is the cost of a call. The telephony application 215 can have access to cost information, such as the charge per minute of a call in each communication mode. The communication mode that charges the least per minute can be selected. In this manner, the telephony application 215 can perform least cost routing.

Another property that can be considered is the location of the mobile device 101. For example, the communication mode selected can depend on whether the mobile device 101 is roaming outside of its home network, or whether the call would be considered a local, long-distance, or international call, etc. Another property to consider is the strength of the call signal available in each communication mode. The communication mode that offers the best signal strength can be selected. The above-described functionality is not limited to being a part of telephony application 215. For example, it can be part of a software application separate from the telephony application 215, or part of the native capabilities (e.g. built-in device drivers or software) of mobile device 101, or.

Exemplary Mobile Device

Figure 2:
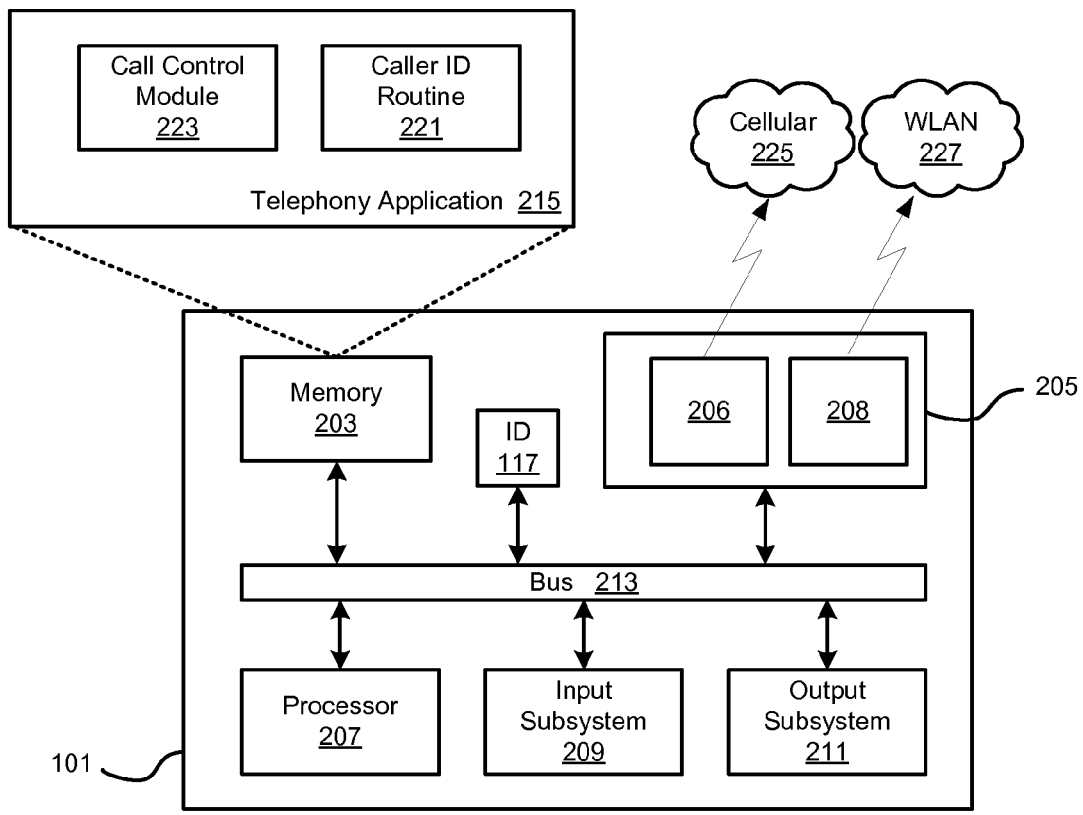
FIG. 2 is a block diagram showing an exemplary mobile device for unified caller identification across multiple communication modes.

FIG. 2 is a block diagram showing an exemplary mobile device 101 for unified caller identification across multiple communication modes. The mobile device 101 can include a memory 203, an identifier (ID) 117, a communication subsystem 205, a processor 207, an input subsystem 209, and an output subsystem 211, which can be coupled to bus 213 or other communication signaling mechanism(s) for interconnecting the components.

The input subsystem 209 can include input devices (which can be built-in or external to the mobile device 101) such as, without limitation, touchscreen, buttons, switches, wheels, keyboard or mouse/pointer, microphone, GPS receiver, camera, sensors (e.g. sensors for motion, light, orientation, speed, acceleration, temperature).

The output subsystem 211 can include output devices (which can be built-in or external to the mobile device 101) such as, without limitation, a display, speaker, lights, and the like.

The mobile device 101 can include a communication subsystem 205 for communicating with a network. Depending on the capabilities and functionality of the mobile device 101, the communication subsystem 205 can include a first radio subsystem 206 for communicating and transmitting signals with a cellular network 225. The communication subsystem 205 also can include a second radio subsystem 208 for communicating and transmitting signals with a WLAN 227.

The processor 207 can execute instructions stored in the memory 203. The memory 203 stores instructions for an operating system, device drivers, software applications, and the like. The memory 203 also can store instructions for a telephony application 215.

The identifier 117 can be a unique phone number (e.g. "650-555-1212") associated with the mobile phone 101 when the mobile phone 101 is used in the first communication mode, or other identifying information unique to the mobile device 101.

In some implementations, the telephony application 215 can be a software program installed on the mobile device 101. The telephony application 215 can include a caller ID routine 221 and a call control module 223. These modules are shown as separate modules in a single application. Depending on the application, these modules also can be combined into one or more modules or found in separate applications as desired. The mobile device 101 can operate in the second communication mode when the telephony application 215 is used to make a call.

The call control module 223 can handle all of the call setup and call handling necessary to make a call through the second service provider. The caller ID routine 221 can detect the identifier 117, and provide the detected identifier 117 to the call control module 223 to be used in the second communication mode. The call control module 223 can send the identifier 117 to the call control module 223 whenever a call is placed in the second communication mode. In some implementations, the caller ID functionality can be disabled such that no identifier is sent when a call is placed in the second communication mode.

In some implementations, the caller ID routine 221 can access or detect the identifier 117 used by the mobile device 101 in the first communication mode. For example, the caller ID routine 221 can run a system query, or detect settings of the mobile device 101. The same identifier 117 can then be used by the call control module 223 in identifying the mobile device 101 when placing a call while operating in the second communication mode.

In some implementations, the caller ID routine 221 can prompt a user to enter an identifier associated with the mobile device 101. Prompting for a user-entered identifier may be necessary when the caller ID routine 221 cannot access the identifier 117 stored in the mobile device 101. In implementations where the mobile device 101 is a non-phone device that carries little or no phone functionalities, there may not be an identifier 117 associated with the mobile device 101 at all.

In some implementations, upon receiving the user-entered identifier, the caller ID routine 221 can perform verification to verify the user-entered identifier. Performing verification can help ensure that the user is actually authorized to use the device associated with the user-entered identifier. There are various ways to verify a user-entered identifier. In some implementations, the second service provider 109 can send a text message (e.g. an SMS message) containing a verification code to the user-entered identifier for verification. If the user is in actual possession of the mobile device associated with the user-entered identifier, then the user will receive the verification code and send the verification code to the second service provider 109 to verify possession.

In other implementations, the second service provider 109 can call the user-entered identifier (e.g., via administrators or machine-enabled calls) and verify in person that the user is in actual possession of the associated mobile device. Other verification methods will be discussed below.

In some implementations, the call control module 223 can utilize Session Initiation Protocol (SIP) to communicate with the second service provider 109. SIP is a signal protocol used in IP telephony to, for example, set up, control, and terminate call sessions. More details regarding SIP can be found in RFC 3261 from the Internet Engineering Task Force (IETF).

Exemplary Process

Figure 3:
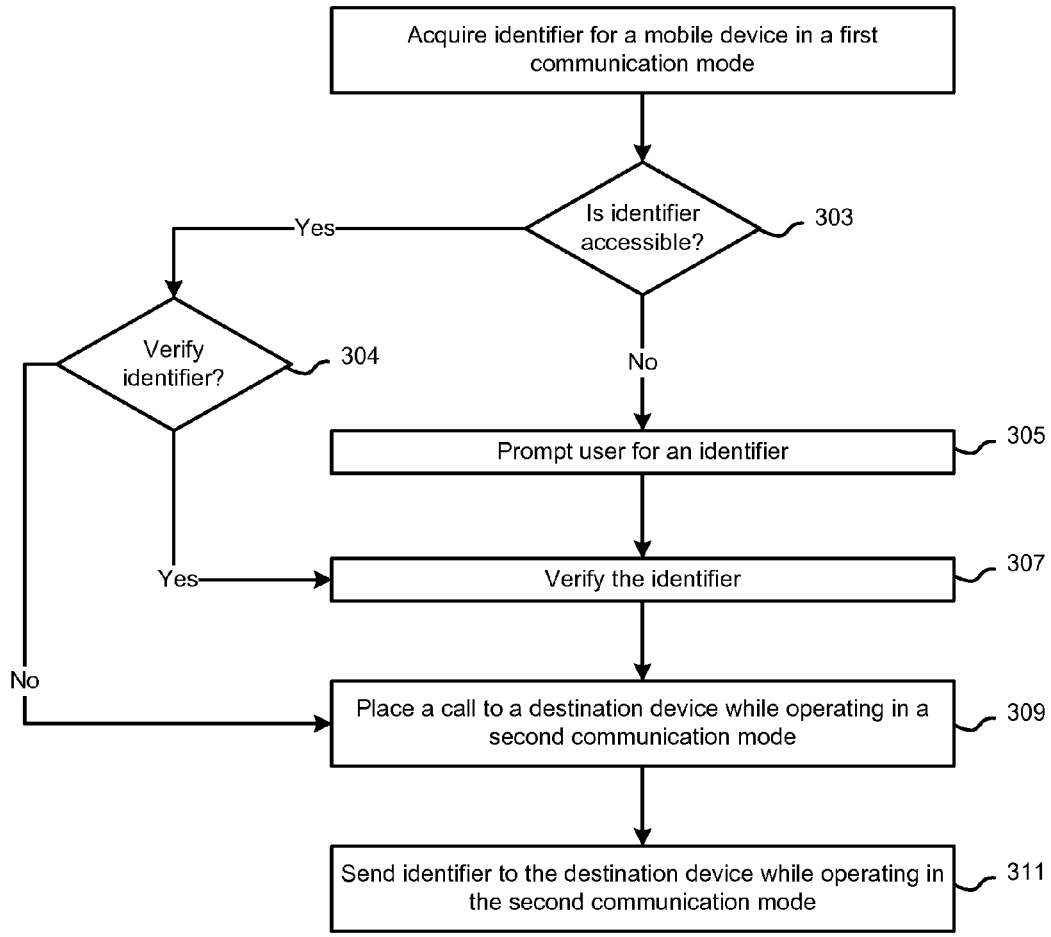
FIG. 3 is a flow chart for an exemplary process for a mobile device with unified caller identification across multiple communication modes.

FIG. 3 is a flow chart for an exemplary process for a mobile device with unified caller identification across multiple communication modes. The operations described herein are not to be construed as necessarily requiring their performance in the particular order discussed or illustrated, unless specifically identified as an order of performance. It is also to be understood that additional or alternative operations may be employed.

At 301, an identifier for a mobile device in a first communication mode can be acquired. For example, the mobile device can be identified by a phone number while operating in a first communication mode. When a call is placed from the mobile device while the mobile device operates in the first communication mode, the phone number can be sent to a destination device to identify the mobile device.

At 303, the accessibility of the identifier can be determined. If the identifier cannot be accessed while the mobile device is operating in the second communication mode, then the user can be prompted to enter the identifier. In some cases, the identifier may not be accessible where the mobile device does not allow installed software applications to access the identifier, or when the mobile device does not operate as a phone by default.

If the identifier can be accessed from the mobile device, then a determination is made at 304 whether to verify the identifier. In some cases, the identifier will be verified as will be discussed at 307 below. In some cases, the identifier will not be verified, and a call can be placed to a destination device, as will be discussed at 309 below.

At 305, a user can be prompted for an identifier if the identifier is not accessible. For example, the telephony application can display a prompt on the mobile device for a user to enter an identifier for the mobile device. The user can enter the phone number of the mobile device, where one exists and is known to the user. The user-entered identifier should match the phone number of the mobile device. When the mobile device does not have phone capabilities by default, then the user can enter the phone number of another telephonic device associated with the user, for example an alternate phone where the user can be reached (e.g., home phone or office phone).

At 307, the identifier can be verified. For example, a second service provider can verify that the user is actually in possession of the mobile device or other telephonic device associated with the phone number entered by the user, and that the user is authorized to use the phone number so as to reduce the risk of fraud, unauthorized usage, or impersonation by a user.

Verification can be accomplished in various ways. For example, the telephony application can send the user-entered phone number to the second service provider. In response, the second service provider can generate a verification code, and send the verification code to the user-entered phone number as part of a Short Message Service (SMS) text message. Once the user receives the verification code (either at the mobile device or other associated telephonic device), the user can send the verification code back to the second service provider to complete verification. In another example, the second service provider can simply call the phone number entered by the user, and verify in person or through machine that the user is authorized to use the phone number.

In some implementations, the second service provider 109 can call the user at the user-entered identifier and play a code (e.g. via administrators or machine-enabled calls) for the user. The user can then contact the second service provider 109 (e.g. via a designated phone number or website) and enter the code to verify possession.

In some implementations, the second service provider 109 can provide a code to the user via email or user-specific web page (e.g. the user's account webpage), and request a call back from the user on the mobile device associated with the user-entered identifier. Once the user calls back with the code, the second service provider 109 receives the identifier for the mobile device and can verify that it matches the user-entered identifier.

In some implementations, the second service provider 109 can provide a dedicated phone number to the user (e.g. through email or a user-specific web page) to call back, using the mobile device associated with the user-entered identifier. Once the user calls back, the second service provider 109 receives the identifier for the mobile device, and can compare the user-entered identifier with the received identifier and verify a match.

At 309, a call can be placed to a destination device while operating in the second communication mode. For example, the call can be sent using the telephony application via the second service provider.

At 311, the identifier can be sent to the destination device while operating in the second communication mode. It should be noted that operations 309 and 311 (as well as all the other operations in FIG. 3) need not be performed in the order listed. For example, the identifier can be sent as part of the call setup and received at the destination device before the call is completed, since the call may never be completed if no one at the destination device answers the call.

Although the present invention has been described in detail with reference to particular implementations, persons possessing ordinary skill in the art to which this invention pertains will appreciate that various modifications and enhancements may be made without departing from the spirit and scope of the claims that follow.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "system" encompasses all apparatus, devices, and machines for processing data, including by way of example a programmable processor, a computer, or multiple processors or computers. The system can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

These computer programs (also known as programs, software, software applications or code) can include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Other implementations fall within the scope of the following claims.

What is claimed is:

1. A method comprising:
   receiving an outgoing call request for a call to be placed from a calling mobile device to a receiving device, wherein the calling mobile device is operable in a non-Voice-Over-Internet-Protocol (VoIP) mode and a VoIP mode;
   determining a phone number associated with the calling mobile device when in the non-VoIP mode;
   prior to placing the call, receiving a selection of one of the non-VoIP mode or the VoIP mode from the calling mobile device; and
   when the selection specifies the VoIP mode:
      determining that the calling mobile device is authorized to use the phone number when in the non-VOIP mode; and
      in response to determining that the calling mobile device is authorized to use the phone number when in the non-VOIP mode, routing the outgoing call request to the receiving device in the VoIP mode including identifying the calling mobile device to the receiving device using the phone number associated with the calling mobile device when in the non-VoIP mode.

2. The method of claim 1, where receiving the selection includes receiving a user selection to disable the VoIP mode, the method further comprising: routing the outgoing call request through a cellular network in the non-VoIP mode including presenting the phone number to the receiving device in the non-VoIP mode.

3. The method of claim 1, further comprising prompting a user of the calling mobile device for the phone number, wherein determining the phone number includes receiving the phone number from the user.

4. The method of claim 1, wherein receiving the selection includes receiving a manual input from a user interface displayed on the calling mobile device selecting one of the non-VoIP mode or the VoIP mode.

5. The method of claim 1, further comprising analyzing the non-VoIP mode and the VoIP mode based on one or more call-related criteria and selecting the non-VoIP mode or the VoIP mode based on the analysis.

6. The method of claim 5, wherein analyzing the non-VoIP mode and the VoIP mode includes comparing a cost of the outgoing call request if the outgoing call request were to be placed in the non-VoIP mode and a cost of the outgoing call request if the outgoing call request were to be placed in the VoIP mode.

7. The method of claim 1, further comprising receiving location information associated with the calling mobile device and selecting the non-VoIP mode or the VoIP mode based on the location information.

8. The method of claim 1, wherein routing the outgoing call request includes routing the outgoing call request through a wireless local area network (WLAN) in the VoIP mode.

9. The method of claim 1, wherein determining the phone number associated with the calling mobile device includes determining the phone number associated with the calling mobile device that communicates with different service providers in the non-VoIP mode and the VoIP mode.

10. The method of claim 1, wherein determining that the calling mobile device is authorized to use the phone number when in the non-VOIP mode comprises:
    generating a verification code;
    sending the verification code to the phone number; and
    displaying a prompt to enter the verification code on the calling mobile device.

11. The method of claim 1, wherein determining that the calling mobile device is authorized to use the phone number when in the non-VOIP mode comprises:
    placing a call to the phone number in the non-VOIP mode.

12. The method of claim 1, wherein determining that the calling mobile device is authorized to use the phone number when in the non-VOIP mode comprises:
    providing a verification code to an entity associated with the phone number when in non-VOIP mode;
    receiving at least one of a message or a call from the entity that includes the verification code; and determining that the calling mobile device is authorized to use the phone number in response to receiving the message or the call from the phone number.

13. A device comprising:
an interface configured to display a phone number associated with a calling mobile device, the calling mobile device operable in a non-Voice-Over-Internet-Protocol (VoIP) mode and a VoIP mode; and a controller configured to: receive an outgoing call request for a call to be placed from the calling mobile device to a receiving device; determine a phone number associated with the calling mobile device when in the non-VoIP mode; prior to placing the call, receive a selection of one of the non-VoIP mode or the VoIP mode from the calling mobile device; when the selection specifies the VoIP mode, determine that the calling mobile device is authorized to use the phone number; and in response to determining that the calling mobile device is authorized to use the phone number when in the non-VOIP mode, route the outgoing call request to the receiving device in the VOIP mode including identifying the calling mobile device to the receiving device using the phone number associated with the calling mobile device when in the non-VoIP mode.

14. The device of claim 13, wherein the controller is configured to: receive a selection to disable the VoIP mode; and present the phone number to the receiving device in the non-VoIP mode.

15. The device of claim 13, wherein the interface is configured to prompt a user of the calling mobile device for the phone number, and receive the phone number from the user.

16. The device of claim 13, wherein the controller is configured to:
analyze the non-VoIP mode and the VoIP mode based on one or more call-related criteria; and
select the non-VoIP mode or the VoIP mode based on the analysis.

17. The device of claim 16, wherein the controller analyzes the non-VoIP mode and the VoIP mode by comparing a cost of the outgoing call request if the outgoing call request were to be placed in the non-VoIP mode and a cost of the outgoing call request if the outgoing call request were to be placed in the VoIP mode.

18. The device of claim 13, wherein the controller is configured to:
receive location information associated with the calling mobile device; and
select the non-VoIP mode or the VoIP mode based on the location information.

19. The device of claim 13, wherein the controller is configured to route the outgoing call request through a wireless local area network (WLAN) in the VoIP mode.

20. A method comprising: receiving an outgoing call request for a call to be placed from a calling communication device to a receiving communication device, wherein the calling communication device is operable in a VoIP mode for making or receiving call requests using a VoIP network, wherein the calling communication device is further operable in a cellular mode for making or receiving call requests through a cellular network, wherein the cellular network comprises a home network and a second different cellular network outside the home network, and wherein the communication device is associated with a first phone number when in the cellular mode; determining whether the VoIP mode is activated on the calling communication device; when the VoIP mode is activated, determining whether the calling mobile device is authorized to use the first phone number when in the cellular mode; analyzing a location of the calling communication device to determine whether the calling communication device is roaming on the second cellular network outside of the home network; and routing the outgoing call request to the receiving communication device using the VoIP mode when the VoIP mode is activated on the calling communication device, the calling communication device is roaming, and the calling mobile device is authorized to use the first phone number when in the cellular mode, wherein routing the outgoing call comprises identifying the calling communication device to the receiving communication device using the first phone number associated with the calling communication device when in the cellular mode.

21. The method of claim 20, further comprising routing the outgoing call request to the receiving communication device through the cellular network in the cellular mode when the VoIP mode is deactivated on the calling communication device.

22. The method of claim 20, wherein routing the outgoing call request includes routing the outgoing call request to the receiving communication device through a wireless local area network (WLAN) in the VoIP mode.

23. The method of claim 20, wherein routing the outgoing call request includes routing the outgoing call request to the receiving communication device using the cellular mode when the VoIP mode is activated on the calling communication device and the calling communication device is not roaming.

* * * * *